May 25, 1965 C. W. McKEE ETAL 3,185,907

CAPACITOR WITH METALLIC EMBEDDED PLASTIC ELECTRODES

Filed Nov. 2, 1959

Inventors
CHESTER W. McKEE
RICHARD W. McKEE
CHARLES M. RICH

By Soans, Anderson, Luedeka & Fitch
Attys

United States Patent Office 3,185,907
Patented May 25, 1965

3,185,907

CAPACITOR WITH METALLIC EMBEDDED PLASTIC ELECTRODES

Chester W. McKee, Flossmoor, Richard W. McKee, Lake Forest, and Charles M. Rich, Chicago, Ill., assignors to Welding Service, Inc., Franklin Park, Ill., a corporation of California Filed Nov. 2, 1959, Ser. No. 850,345
2 Claims. (Cl. 317—258)

The present invention relates generally to electrical condensers and, more particularly to the construction of an electrical condenser having unique frequency-impedance characteristics. A condenser made in accordance with the teachings of the invention may be so constructed as to present a substantially constant impedance over a broad band of frequencies.

As is well known, the reactance of the usual condenser varies inversely with the frequency of the alternating signal applied to the condenser, that is, as the frequency is increased, the reactance of the condenser decreases. Of course, the impedance of a condenser not only includes a reactance component but also includes a resistance component which, in a condenser employing the normal construction and dielectric material, is relatively minor.

In many applications, a variation in impedance produces undesirable results. This is especially true when a broad band of frequencies are to be passed through a condenser. For a given amplitude of the input signal, the output amplitude of the higher frequencies will be higher than the amplitude of the lower frequencies, and for a given load the phase shift of the higher frequencies will be less than the phase shift of the lower frequencies. This results in undesirable distortion of the input signal.

It has been previously assumed that the change of the impedance of a condenser with frequency was an inherent feature of a condenser, and relatively elaborate circuits have been designed to compensate for these changes. Generally, however, these compensating circuits have been quite limited in frequency response, and those which provide good frequency response are usually quite complex and, therefore, quite expensive.

The principal object of the present invention is the provision of a condenser which has an impedance which is less subject to change with frequency than the usual condenser. Another object of the invention is the provision of a condenser which has an impedance which is relatively independent of frequency. Still another object is the provision of a condenser which causes less phase shift than a standard condenser. A further object of the invention is the provision of a condenser which is relatively inexpensive and simple to manufacture.

Other objects and advantages of the invention will become apparent by reference to the following description and accompanying drawings.

It has been discovered that, by making at least one of the electrodes of a condenser from a sheet of material having a relatively high specific resistivity, the impedance of the condenser may be made substantially constant with variations in frequency, but in any event will vary substantially less than that of a standard condenser. Moreover, the phase shift of the current through the condenser is substantially less than that of a standard condenser. Also, as will hereinafter be pointed out, proper positioning of the leads of the condenser on the electrodes or plates will enhance the constant frequency response characteristics of the condenser.

Figure 1:
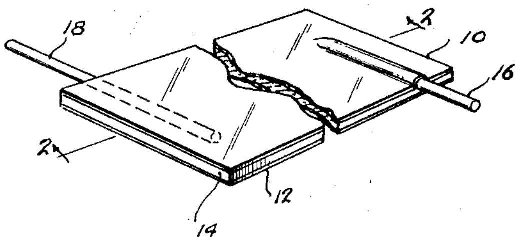
FIGURE 1 is a schematic, perspective view of a condenser embodying various of the features of the invention.
Figure 2:
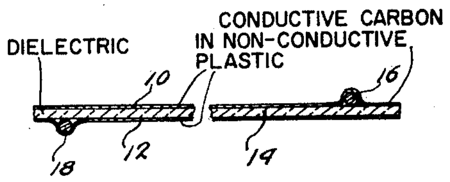
FIGURE 2 is a schematic, sectional view taken on line 2—2 of FIGURE 1.

A condenser in accordance with this invention includes at least two electrodes or plates with a suitable dielectric disposed between the electrodes. It also includes leads connected to the electrodes. As shown in FIGURE 1, the condenser schematically illustrated includes a pair of relatively thin electrodes or plates 10 and 12 separated by a sheet 14 of dielectric material, such as mica, paper, etc. The plates 10 and 12 in the illustrated embodiment are made of a material having a high specific resistivity as will be pointed out. A wire conductor or lead 16 is suitably connected along one end of the upper plate 10, and a second lead 18 is connected along the opposite end of the lower plate 12.

In accordance with the invention, the plate or electrode is provided with a relatively high average resistance for each unit of effective area of the plate. (Effective area of the plate is the area of the plate's surface which is coextensive with the other plate's surface.) This may be provided by constructing the plate from a material having a correlated specific resistivity and thickness so as to provide the desired resistance per unit of effective area. It has been found that a plate having a resistance of over about 100 ohms per square inch of effective area provides preferred results. (Resistance per square inch of effective area as described above may be determined by measuring the D.C. resistance of a section of plate material one inch square in surface area. Alternatively, the D.C. resistance per square inch of effective area of a larger plate may be calculated by dividing the resistance of the larger plate by the length of the current path in inches and multiplying by the width of the current path.) It has been found that the higher the resistance per square inch of effective area of the electrode, the less effect frequency has on the impedance, and the less the phase shift through the condenser.

Preferably, for best results, the plates are elongated and the leads are connected to the transverse ends of the plates in order to provide an extended current path along the plates.

A sheet of material suitable for use as an electrode in a condenser of the type here under consideration may be fabricated by dispersing particles of material having an appropriate resistivity over an area in such concentration as to produce the desired resistance per square inch. Higher concentrations of the particles will decrease the resistance per square inch, and lower concentrations will, of course, increase the resistance per square inch. The particles may be supported in any suitable manner.

Conductive particles may be dispersed in a relatively non-conductive plastic which may be fabricated into a sheet to provide a conductive plastic sheet suitable for use as an electrode. In the plastic, conductive particles such as carbon, in the form of graphite or carbon black, metal particles, etc., may be used.

In one illustrative embodiment of the condenser, a conductive plastic is used for the electrode material. The conductive plastic is made by mixing one part by weight of an aqueous emulsion containing 50 percent by weight of urea formaldehyde resin, a suitable emulsion being the one sold under the trade name "Formbond No. 436" by the Industrial Adhesive Co., and one part by weight of an aqueous emulsion containing 50 percent by weight of polyvinyl acetate such as that sold under the trade name "Elvacet" by Du Pont. Approximately 20 percent by weight of flaked graphite of a size which will pass through a 300 mesh screen is then added and thoroughly dispersed in the plastic emulsion. The resulting mixture is then diluted with sufficient water to provide the desired consistency and is then painted on a dielectric sheet of polyethylene terephthalate resin, such as that sold under the trade name "Mylar." The plastic carrier for the graphite is then cured. Suitable conditions for curing the plastic which has been described involve the use of a temperature of about 60° C. for two hours or drying it overnight at room temperature. The finished coating is about .0005 inch in thickness and the resistance per square inch of surface area is about 645 ohms.

As another illustrative embodiment of a condenser plate material of conductive plastic, one part by weight of cellulose nitrate is mixed with two parts by weight of acetone. To this mixture about 1 percent by weight of acetyl tributyl citrate is added as a plasticizer. Approximately 20 percent by weight of flaked graphite of a size which will pass through a 300 mesh screen is added to the mixture and thoroughly dispersed therein. The graphite-plastic mixture is thinned, if necessary, with a suitable solvent, such as acetone, to produce the desired consistency, and is then applied to a sheet of Mylar or other suitable dielectric material in a similar manner as that described previously. The solvent is evaporated either by air drying or by the use of suitable drying equipment. The finished coating is about .0005 inch in thickness and the resistance per square inch of surface area is about 644 ohms.

Depending upon the resistance per unit effective area desired, the amount of graphite, carbon black, or other material employed as the conductor can be varied over wide limits, the amount being limited only by the resistance desired and the mechanics of forming it into a sheet of the desired thickness. Similarly, the thickness of the layer of material may be varied over wide limits, depending upon the resistivity of the material and the resistance per unit area desired. Other plastic carriers may also be used, including water emulsions of plastics, solutions of plastics or hot melt plastics, the only limitations upon the plastic being that it have a high resistance, i.e., that it is substantially an insulating material, and that it may be formed into the desired layer.

An additional feature of the invention involves the discoverey that, when high resistance plates or electrodes are employed in the condenser, the positioning of the leads of the condenser on the plates has a marked effect upon the impedance-frequency relationship. It has been discovered that, when a condenser is made from elongated plates having resistance characteristics as outlined in the foregoing, variations in impedance for variations in frequency are minimized when the leads for adjacent plates are located at opposite ends of the assemblage. Such a construction is shown schematically in FIGURE 1. In this figure, the lead 16 for the upper plate 10 is electrically connected at one end of the assemblage and the lead 18 for the lower plate 12 is electrically connected at the other end of the assemblage.

Figure 3:
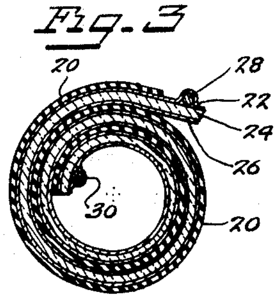
FIGURE 3 is a schematic, vertical cross section of a condenser which includes features of the present invention.

A typical rolled condenser employing this construction is shown in FIGURE 3. In the construction shown in FIGURE 3, a laminated assemblage, including in sequence a dielectric layer 20, a plate 22, a second dielectric layer 24, and a second plate 26, is rolled together to produce a roll type condenser. In this condenser, a lead 28 for the outer plate 22 is secured at the outer end of the roll and a lead 30 for the plate 26 is secured to the end of that plate at the core of the roll. Of course, the entire condenser is covered with a suitable insulating coating (not shown) of paper or plastic and wax in the usual manner.

A condenser, constructed in this manner, shows minimum impedance-variations with changes in frequency with a given resistance per unit effective area of the plate material.

Figure 4:
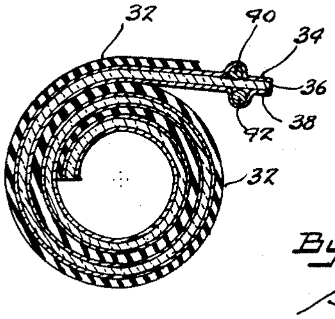
FIGURE 4 is a view similar to FIGURE 3 showing another embodiment of the invention.

Certain benefits of the invention may be obtained when the leads for adjacent plates are located at the same end of the assemblage. A typical rolled condenser employing this construction is shown in FIGURE 4. In the construction shown in FIGURE 4, a laminated assemblage, including in sequence a dielectric layer 32, a plate 34, a second dielectric layer 36, and a second plate 38, is rolled together to produce a roll type condenser. In this condenser, a lead 40 for the outer plate 34 and a lead 30 for the plate 38 are secured to the ends of plates which are at the outer end of the roll. Again, the entire condenser is covered with a suitable insulating coating (not shown) such as paper or plastic and wax in the usual manner. A condenser, constructed in this manner, shows a marked decrease in impedance variations for changes in frequency as compared with a standard condenser but the decrease in impedance variations is not minimized to the extent that it is when the construction shown in FIGURE 3 is employed with similar areas and types of plates.

*Example I*

As one specific embodiment, a condenser is constructed by employing a sheet of Mylar having a thickness of .0005 inch as the dielectric material. The dielectric sheet employed is 65 inches long and 1½ inches wide. The plates or electrodes of the condenser are formed of conductive plastic which is applied to opposite faces of the Mylar sheet so that the dielectric itself serves to support the conductive plastic. In order to simplify construction, the stripes of conductive plastic on opposite sides of the Mylar sheet are offset one from the other so that when the sheet is folded longitudinally a laminated assemblage will be produced which includes a section of Mylar, a layer of conductive plastic, a section of Mylar and a second layer of conductive plastic. This assemblage can then be rolled to provide a typical rolled type condenser.

The conductive plastic is made by employing the urea formaldehyde resin-polyvinyl acetate-graphite mixture which has been previously described, the mixture containing 20 percent graphite by weight. The material is painted on the Mylar in two longitudinally extending stripes approximately 1¼ inches wide, as described above, each of the stripes being approximately .0005 inch thick after the resin is cured. The resin is cured by holding it at 60° C. for about two hours. After the conductive plastic is applied, a piece of copper wire is attached to one end of each of the stripes. The connection is made to one stripe at one end of the sheet and to the other stripe at the other end of the sheet.

A direct current resistance measurement is made on each stripe and one stripe measures approximately 35 kilohms from end to end, and the other stripe measures approximately 31 kilohms from end to end. Thus, the resistance per unit of effective area of the one stripe is approximately 684 ohms per square inch and the resistance per unit of effective area of the other stripe is approximately 606 ohms per square inch. The coated sheet is then folded longitudinally between the offset stripes and rolled to produce a condenser of the type shown in FIGURE 3. The capacity of the condenser is measured at 1000 cycles per second and will be found to be about 0.0741 microfarad.

As a test the condenser is connected in series with a variable frequency, constant voltage power source and a 100 kilohm resistor. A vacuum tube voltmeter is connected across the resistor. The output voltage for an input voltage of 1.0 volt is measured. The results of this test are shown in the table which appears below.

The improved capacitor of the invention is then replaced by a .0001 to .011 microfarad decade condenser box connected in parallel with a .01 to 1.1 microfarad decade condenser box. The decade condenser boxes are adjusted until the output voltage is equal to the output voltage obtained using the condenser of Example I. The setting of the decade boxes is shown in the table below.

| Frequency in c.p.s. | Output in volts for a condenser of Example I | Condenser value in microfarads required to obtain same output |
|---|---|---|
| 25 | .52 | .062 |
| 50 | .74 | .044 |
| 100 | .81 | .0287 |
| 200 | .84 | .0136 |
| 400 | .85 | .0072 |
| 800 | .85 | .0038 |
| 1,600 | .86 | .0023 |
| 3,200 | .864 | .0013 |
| 6,400 | .872 | .0007 |
| 12,800 | .872 | .0005 |
| 25,600 | .88 | .0005 |
| 51,200 | .87 | .00038 |

As will be seen from the foregoing table, the frequency response characteristic of a condenser, made in accordance with the teachings of the invention, utilized as a coupling condenser, is extremely flat and shows substantially no material variations over a wide range of frequencies. To match this frequency response characteristic with a standard condenser, it is necessary to provide a circuit which effectively varies the coupling condenser value over a wide range.

Figure 5:
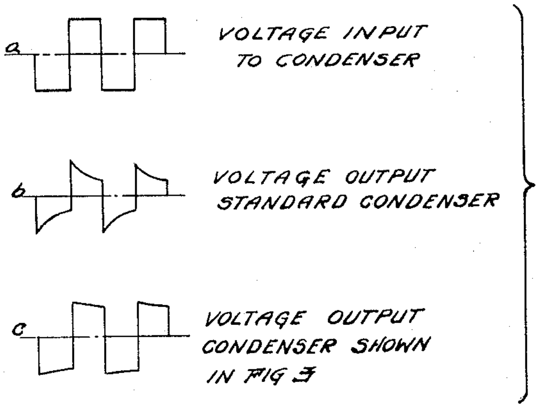
FIGURE 5 is a set of curves showing a comparison of the output waves when a square wave input is impressed upon a standard condenser and a condenser constructed in the manner shown in FIGURE 3.

As a second test, the .0741 mfd. condenser described above is connected in series with a 100 kilohm resistor and a square wave source of 200 cycles per second. The output wave form is shown at *c* in FIGURE 5. The output wave form obtained by substituting a standard .0741 mfd. paper condenser for the condenser described above is shown at *b*. From a comparison of these wave forms it can be seen that the condenser in accordance with the invention equally passes substantially all of the frequencies in a square wave and passes the frequencies without a material phase shift.

As a third test the .0741 microfarad condenser described above is connected in series with a 1000 c.p.s. sine wave power source and a 2200 ohm resistor. The phase shift of the current passing through circuit is measured by applying the voltage across the condenser to the horizontal plates of an oscilloscope and the voltage across the resistor to the vertical plates. The resulting Lissajous figure indicates that the phase shift is approximately 15 degrees. A standard .0741 microfarad paper condenser is substituted for the condenser described above and the resulting Lissajous figure indicates that the phase shift is approximately 45 degrees. Thus it can be seen that the phase shift through a condenser constructed in accordance with the invention is substantially less than a standard condenser of equal capacity at 1000 c.p.s.

*Example II*

As a second specific embodiment, a condenser is constructed as described above, except that the connection is made to each stripe at the same end of the assemblage, as shown in FIGURE 4. The capacity at 1000 c.p.s. is about .0741 microfarad.

As a test, this condenser is connected in series with a variable frequency, constant voltage power source and a 100 kilohm resistor. A vacuum tube voltmeter is connected across the resistor. The output voltage for an input voltage of 1.0 volt is shown in the table below.

Standard decade condenser boxes are substituted for the conductive plastic condenser, and the capacity of the decade boxes necessary to provide the same output voltage is also set forth in the table below.

| Frequency in c.p.s. | Output in volts for a condenser of Example II | Condenser value in microfarads required to obtain same output |
|---|---|---|
| 25 | .60 | .065 |
| 50 | .79 | .046 |
| 100 | .84 | .0292 |
| 200 | .86 | .0145 |
| 400 | .89 | .0085 |
| 800 | .92 | .0054 |
| 1,600 | .93 | .0033 |
| 3,200 | .94 | .0021 |
| 6,400 | .96 | .0018 |
| 12,800 | .962 | .0016 |
| 25,600 | .98 | .0017 |
| 51,200 | .99 | .0024 |

The reasons for the highly improved operation of a condenser made under the teachings of this invention are not entirely clear. The following is an explanation for the results; however, it is to be understood that the explanation is purely theoretical and is not to be considered as a limitation on the claims or in the interpretation of the patent except as it is expressely incorporated in a claim or claims.

As is well known, when a direct current voltage source is connected to a standard condenser comprising a pair of metallic electrodes separated by a dielectric, the electrode connected to the positive side of the direct current voltage source has a deficiency of electrons, and the electrode connected to the negative side of the source has an excess of electrons. Normally, the excess electrons are distributed substantially instantaneously and substantially uniformly over the entire area of the one metallic electrode, and the area of the other metallic electrode is uniformly deficient of electrons.

The capacity of a standard condenser is determined by the number of electrons stored in the negative electrode divided by the potential difference produced between the electrodes due to the excess and deficiency of electrons. The capacity of a standard condenser is relatively independent of frequency because the mobility of the electrons in the electrodes is such that, even at a high frequency, the electrons are distributed over substantially the entire area of the electrode before the applied voltage is reversed. Hence, at low frequencies the impedance of a standard condenser varies approximately inversely with the frequency, the impedance of a standard condenser at low frequencies being substantially a reactance.

In a condenser, in accordance with the teaching of the invention, wherein the plates are made of a resistive material, the resistive character of the plates decreases electron mobility and, therefore, at higher frequencies the plates will not have electrons uniformly distributed over their surfaces or in the same number as will accrue at lower frequencies when there is time for complete and uniform distribution. In this connection, the potential across the plates in different areas will vary due to the resistance in the plates. This effect apparently produces a compensation for the impedance variation due to changes in frequency.

From the above, it can be seen that a condenser embodying the features of this invention may be constructed so that the effect of frequency on its impedance is reduced and, if desired, can be virtually eliminated, and the phase shift through the condenser is relatively minor. Moreover, it should be apparent that the condenser is relatively inexpensive and simple to manufacture.

Various changes and modifications may be made in the construction and materials employed without departing from the spirit or scope of this invention. Various features of the invention are set forth in the accompanying claims.

We claim:

1. A frequency variable electrical condenser comprising two elongated planar electrodes having a dielectric disposed therebetween, said electrodes being comprised of flake graphite of a size such as to pass through a 300-mesh screen dispersed in a non-conductive plastic carrier, the concentration of the graphite in the plastic carrier and the thickness of the electrode being such as to provide a resistance per unit of effective area over about 100 ohms per square inch, a first lead connected along one transverse end of one of said electrodes, and a second lead connected along the transverse end of said other electrode which is opposite the end where said first lead is connected to said one electrode.

2. An electrical condenser comprising an elongated sheet of dielectric material, an elongated coating of conductive carbon dispersed in a substantially non-conductive plastic carrier disposed on each surface of said sheet, each of said coatings being of a thickness and having a concentration of carbon such as to provide a resistance per unit of effective area over about 100 ohms per square inch, a first lead connected along one transverse end of one of said coatings, and a second lead connected along the transverse end of said other coating which is opposite the end where said first lead is connected to said one electrode.

References Cited by the Examiner

UNITED STATES PATENTS

| | | | |
|---|---|---|---|
| 965,992 | 8/10 | Dean | 317—260 |
| 2,018,522 | 10/35 | Herrmann | 317—260 |
| 2,126,915 | 8/38 | Norton | 317—258 |
| 2,211,583 | 8/40 | Ruben | 317—258 |
| 2,321,587 | 6/43 | Davie | 317—258 |
| 2,403,657 | 7/46 | Harvey | 317—258 |
| 2,599,508 | 6/52 | Allison | 317—260 |
| 2,627,645 | 2/53 | Harris | 29—25.42 |
| 2,745,774 | 5/56 | Reid | 117—226 |
| 2,788,296 | 4/57 | Louis | 117—226 |
| 2,891,204 | 6/59 | Kuhn | 317—260 |
| 2,915,808 | 12/59 | Clemons | 29—25.42 |

JOHN F. BURNS, *Primary Examiner.*

SAMUEL BERNSTEIN, E. JAMES SAX, *Examiners.*